United States Patent [19]
Hardtmann

[11] 3,899,507
[45] Aug. 12, 1975

[54] PROCESS FOR PREPARING IMIDAZO-[(2,1-A)]ISOINDOLES
[75] Inventor: Goetz E. Hardtmann, Florham Park, N.J.
[73] Assignee: Sandoz, Inc., E. Hanover, N.J.
[22] Filed: July 30, 1973
[21] Appl. No.: 384,035

[52] U.S. Cl. ............................ 260/309.6; 260/250 P
[51] Int. Cl. ............................................ C07d 49/36
[58] Field of Search ............................. 260/309.6

*Primary Examiner*—Henry R. Jiles
*Assistant Examiner*—C. M. S. Jaisle
*Attorney, Agent, or Firm*—Gerald D. Sharkin; Robert S. Honor

[57] ABSTRACT

Imidazo[2,1-a]isoindoles, useful as anorexics, are prepared by various routes from imidazo[2,1-a]phthalazines.

6 Claims, No Drawings

PROCESS FOR PREPARING IMIDAZO-(2,1-A)ISOINDOLES

This invention relates to preparation of intermediates useful in preparing imidazo[2,1-a]isoindoles of the formula

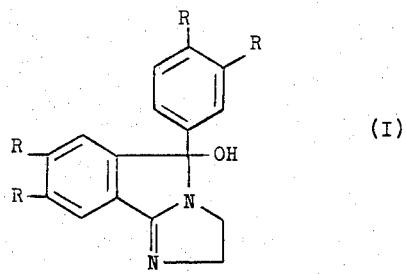

where each R, independently, represents H or halo having an atomic weight of 19–36.

These compounds (I) are known to be useful as anorexics, and may be utilized as indicated in the art for the treatment of anorexia.

A compound of formula (I) may be prepared by hydrolyzing a compound of formula

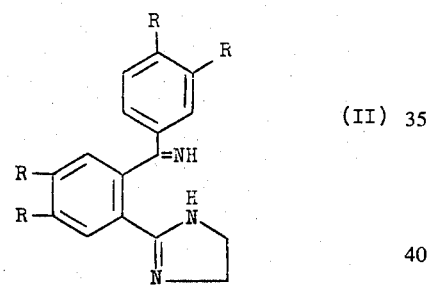

where R is as defined above, which for convenience need not be separated from the reaction mixture in which it is obtained, or an acid addition salt thereof, with conventional hydrolyzing agents such as dilute bases, e.g. dilute alkali metal hydroxide such as dilute sodium or potassium hydroxide, or with dilute aqueous acid, such as dilute aqueous strong mineral acid, e.g. hydrochloric acid, or dilute aqueous organic acid, e.g. acetic acid, at about room temperature to about 50°C. for about 2–24 hours. This method is generally disclosed in the art and is not part of this invention.

A compound of formula (II) may be prepared from a compound of the formula (III)

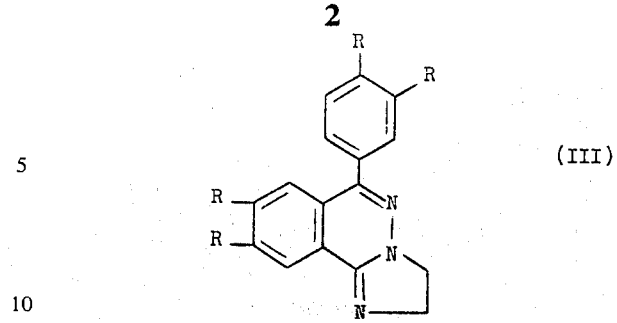

where R is as defined above, by reducing the latter, and particularly reducing the latter with mild reducing agents such as a system of acetic acid, hydrochloric acid and zinc, or by the use of a catalytic reducing agent such as Raney nickel with hydrogen. When utilizing the zinc/acetic acid/hydrochloric acid type system, the reaction may be conducted at about 0° to 50°C. but is more conveniently conducted at about room temperature for a period of about 5 minutes to about 24 hours, more conveniently about one-half to 4 hours. When the Raney nickel hydrogen reduction is performed, it may be conducted at about 20° to 120°C., preferably about 30° to 60°C. for about 0.5 to 12 hours, in solvent such as ethanol or dioxane.

A compound (III) may be prepared from a compound of the formula

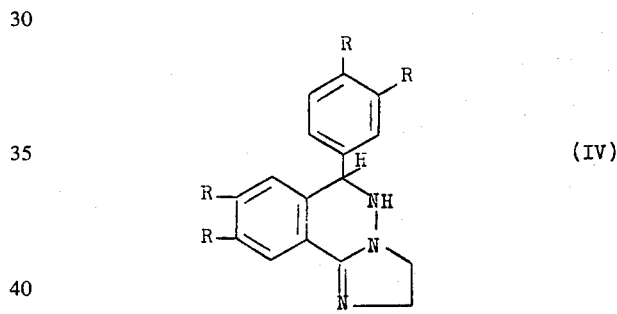

where R is as defined above, by treating compound (IV) with a strong oxidizing agent such as manganese dioxide, aqueous potassium permanganate, or 2,3-dichloro-5,6-dicyanobenzoquinone (DDQ) in inert solvent such as an aromatic hydrocarbon, e.g. benzene or xylene, or in ethers such as dioxane, tetrahydrofuran and the like, or halogenated aromatic hydrocarbons such as chlorobenzene. The reaction may be conducted at a temperature of about 0° to 150°C., for about 0.5 to 10 hours, but the reaction temperature when using DDQ as oxidizing agent is preferably 60°–130°C.

A compound (IV) is prepared according to the following reaction scheme:

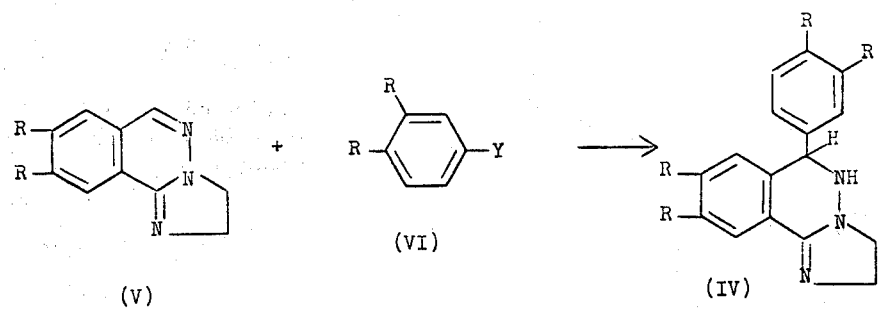

where
  R is as defined above, and
  Y is MgX or Li,
where
  X is halo of atomic weight about 35–80.

A compound (IV) may be prepared in a two-step procedure by first treating compounds (V) and (VI) in an organic solvent medium at temperatures of about −40°C. to about +50°C., preferably about 0°C. to 10°C. and then hydrolyzing the resulting material. The first step of the reaction may be suitably carried out in a number of well known organic solvents, preferably an organic ether including both the acyclic and cyclic ethers such as diethyl ether, dimethoxyethane, tetrahydrofuran, or dioxane or a mixture thereof, more preferably a cyclic ether such as tetrahydrofuran. Whereas the mole ratio of compound (VI) to the compound of formula (V) is not critical, it is preferred that an excess of compound (VI) be used, preferably in the molar ratio of about 2:1 to 10:1. Preferably, Y represents Li in the above-described process. This reaction step is desirably conducted under anhydrous conditions. The hydrolysis is a standard alkaline or acid hydrolysis which may be conducted using conventional techniques.

A compound (III) may also be prepared from a compound of formula

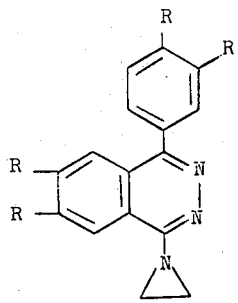

(VII)

where R is as defined above, by treating the latter with iodide anion or a source thereof such as an alkali metal iodide at a temperature of about 0° to 70°C., preferably about room temperature, in solvent such as methylenechloride, methylethylether, or acetone, preferably the latter. The reaction may be conducted over a period of 0.5 to 30 hours. This reaction may also be carried out by heating the compound (VIII) at about 50°–150°C., preferably 100°–120°C. for about .5–30 hours.

A compound (VII) may be prepared by treating a compound of the formula

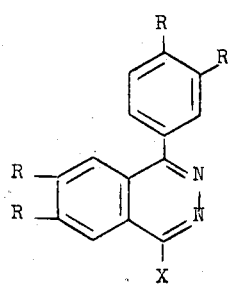

(VIII)

where R and X are defined above, with ethyleneimine at a temperature of 0° to 60°C., preferably 20° to 30°C. As will be appreciated, excess ethyleneimine may be used as solvent.

A compound of formula (II) may also be obtained by treating a compound of the formula

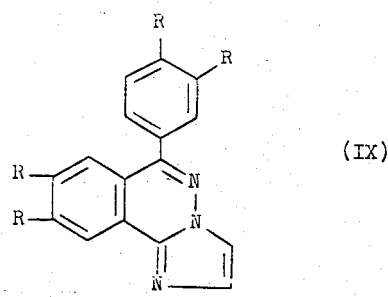

(IX)

where R is defined above, under the same reaction conditions as indicated above for catalytically reducing compound (III) in the obtaining of the compound (II).

Except where specifically indicated otherwise, the particular solvents utilized as well as the temperatures and times of reaction are not critical in obtaining the above-indicated products, and selection of particular solvents, and temperatures and times of reaction will be within the skill of a person having ordinary skill in the organic chemical arts. Thus, for example, aromatic solvents such as benzene, toluene, and the like, pyridine, lower alkanols, cyclic and acyclic ethers or other commonly used solvents or mixtures thereof may be so used.

Except as otherwise stated, the products obtained according to the above-indicated reactions may be separated from the reaction mixtures by conventional techniques, for instance, crystallization, chromotography, concentration, and the like.

Certain of the compounds of formulas (V), (VI), (VIII) and (IX) are known and prepared by methods specifically disclosed in the literature. Those compounds of formulas (V), (VI), (VIII), and (IX) not specifically disclosed in the literature may be obtained by analogous methods from known materials.

As will be appreciated by persons skilled in the art, compounds (III), (IV), (V), (VII), (VIII) and (IX) form acid addition salts and such salts may be used interchangeably with their corresponding free bases in the various processes described above. Examples of such acid addition salts are the inorganic acid addition salts such as the hydrohalides, e.g. the hydrobromide or the hydrochloride, and the organic acid addition salts such as the acetic, benzoic or maleic acid addition salts. For simplification, specific reference to these salts is not made elsewhere in the specification or claims but they are intended to be included within the scope of this invention.

EXAMPLE 1

6-(p-Chlorophenyl)-2,3,5,6-tetrahydroimidazo[2,1-a]phthalazine

In 250 ml. of anhydrous tetrahydrofuran is dissolved 16 g. of 2,3-dihydroimidazo[2,1-a]phthalazine. The mixture is cooled and with two equivalents of commercial p-chlorophenyllithium are added while maintaining the reaction mixture at about 5°C. The reaction mixture is allowed to warm up to room temperature and is stirred at that temperature for 2 hours, after which period ice and 2N hydrochloric acid are slowly added until pH 2 is reached. The pH is then adjusted to about 7 with dilute sodium hydroxide solution and the mixture extracted with water and saturated sodium chloride solution. The organic phase is dried with sodium sulfate and evaporated in vacuo to obtain 6-(p-chlorophenyl)-2,3,5,6-tetrahydroimidazo [2,1-a]phthalazine.

When the above process is carried out and
a. phenyl lithium or
b. 3,4-dichlorophenyl magnesium bromide
is used in place of p-chlorophenyl lithium, there is obtained
 a. 6-phenyl-2,3,5,6-tetrahydroimidazo[2,1-a]phthalazine, or
 b. 6-(3,4-dichlorophenyl)-2,3,5,6-tetrahydroimidazo[2,1-a] phthalazine, respectively.

When the above detailed process is carried out and 8-chloro-2,3-dihydroimidazo[2,1-a]phthalazine is used in place of 2,3-dihydroimidazo [2,1-a]phthalazine, there is obtained 8-chloro-6-(p-chloro)-2,3,5,6-tetrahydroimidazo[2,1-a]phthalazine.

EXAMPLE 2

6-(p-Chlorophenyl)-2,3-dihydro-imidazo[2,1-a]phthalazine

In 200 ml. of xylene is dissolved 15 g. of 6-(p-chlorophenyl)2,3,5,6-tetrahydroimidazo[2,1-a]phthalazine and 7 g. of manganese dioxide is then added and while stirring the mixture is heated to 80°–100°C. for 8 hours. After cooling the mixture, it is filtered and evaporated in vacuo. The residue is crystallized from methylenechloride: ethyl ether (1:1) to obtain 6-(p-chlorophenyl)-2,3-dihydro-imidazo[2,1-a] phthalazine.

When the above process is carried out and
a. 6-phenyl-2,3,5,6-tetrahydroimidazo[2,1-a]phthalazine,
b. 6-(3,4-dichlorophenyl)-2,3,5,6-tetrahydroimidazo[2,1-a] phthalazine, or
c. 8-chloro-6-(p-chlorophenyl)-2,3,5,6-tetrahydroimidazo[2,1-a] phthalazine
is used in place of 6-(p-chlorophenyl)-2,3,5,6-tetrahydroimidazo[2,1-a] phthalazine, there is obtained
a. 6-phenyl-2,3-dihydroimidazo[2,1-a]phthalazine,
b. 6-(3,4-dichlorophenyl)-2,3-dihydroimidazo[2,1-a]phthalazine,
or
c. 8-chloro-6-(p-chlorophenyl)-2,3-dihydroimidazo[2,1-a]phthalazine, respectively.

EXAMPLE 3

5-(p-Chlorophenyl)-5-hydroxy-2,3-dihydro-5H-imidazo[2,1-a]isoindole 6-(p-Chlorophenyl)-2,3-dihydroimidazo[2,1-a]phthalazine (5 g.) is dissolved in dilute acetic acid (1:1, 100 ml.) and hydrochloric acid (10 ml., 2N). Zinc dust (15 g.) is added in small portions over a period of 60 minutes while the mixture is stirred to convert the starting phthalazine to 4'-chloro-2-(2-imidazolin-2-yl)benzhydrylideneimine. The stirring is continued for 1 hour at room temperature. The reaction mixture is then filtered with glass wool and the filtrate poured over ice/water (200 g/100 ml.). Additional water is added (200 ml.) and the mixture is made basic with 2N sodium hydroxide. The precipitate which forms is filtered off and dried. The filtrate is extracted with methylene chloride (200 ml.). The organic phase is washed twice with 200 ml. of water, dried over sodium sulfate and evaporated in vacuo. The residue is combined with the dried precipitate obtained above and recrystallized from dimethylformamide to obtain 5-(p-chlorophenyl)-5-hydroxy-2,3-dihydro-5H-imidazo[2,1-a]isoindole.

When the above process is carried out and in place of 6-(p-chlorophenyl)-2,3-dihydroimidazo[2,1-a]phthalazine there is used
 a. 6-phenyl-2,3-dihydroimidazo[2,1-a]phthalazine,
 b. 6-(3,4-dichlorophenyl)-2,3-dihydroimidazo[2,1-a] phthalazine, or
 c. 8-chloro-6-(p-chlorophenyl)-2,3-dihydroimidazo[2,1-a] phthalazine
there is obtained
 a. 5-hydroxy-5-phenyl-2,3-dihydro-5H-imidazo[2,1-a]isoindole,
 b. 5-hydroxy-5-(3,4-dichlorophenyl)-2,3-dihydro-5H-imidazo [2,1-a]isoindole, or
 c. 7-chloro-5-hydroxy-5-(p-chlorophenyl)-2,3-dihydro-5H-imidazo [2,1-a]isoindole, respectively,
through the corresponding compound of formula (II) above, namely
 a'. 2-(2-imidazolin-2-yl)benzhydrylideneimine,
 b'. 3',4'-dichloro-2-(2-imidazolin-2-yl)benzhydrylideneimine, or
 c'. 4',5-dichloro-2-(2-imidazolin-2-yl)benzhydrylidenimine, respectively.

EXAMPLE 4

1-(p-Chlorophenyl)-4-ethyleneimino phthalazine

In 120 ml. of ethyleneimine is dissolved 12. of 4-chloro-1-(p-chlorophenyl)phthalazine and the mixture is kept at room temperature for 8 hours. The reaction mixture is evaporated in vacuo at 30°C. to obtain 1-p-chlorophenyl-4-ethyleneimino phthalazine.

When the above process is carried out and
a. 4-chloro-1-phenyl phthalazine,
b. 4-chloro-1-(3,4-dichlorophenyl) phthalazine, or
c. 4,7-dichloro-1-p-chlorophenyl phthalazine,
is used in place of 4-chloro-1-(p-chlorophenyl)-phthalazine, there is obtained
 a. 4-ethyleneimino-1-phenyl phthalazine,
 b. 1-(3,4-dichlorophenyl)-4-ethyleneimino phthalazine, or
 c. 7-chloro-1-(p-chlorophenyl)-4-ethyleneimino phthalazine,
respectively.

EXAMPLE 5

6-(p-Chlorophenyl)-2,3-dihydro-imidazo[2,1-a]phthalazine

Crude 1-(p-chlorophenyl)-4-ethyleneimino phthalazine (16 g.) is dissolved in acetone (180 ml.), potassium iodide (0.8 g.) is added and the mixture stirred at room temperature overnight. The insoluble material is filtered off and the filtrate is evaporated to dryness. The residue is dissolved in 300 ml. chloroform, the solution extracted with water and saturated sodium chloride solution and the organic phase evaporated. The crude material is dissolved in chloroform, filtered through silica, treated with charcoal, filtered and evaporated. The residual oil crystallizes on the addition of methylene chloride to provide 6-(p-chlorophenyl)-2,3-dihydroimidazo[2,1-a]phthalazine.

When the above process is carried out and in place of 1-p-chlorophenyl-4-ethyleneimino phthalazine there is used
- a. 4-ethyleneimino-1-phenyl phthalazine,
- b. 1-(3,4-dichlorophenyl)-4-ethyleneimino pthalazine, or
- c. 7-chloro-1-(p-chlorophenyl)-4-ethyleneimino phthalazine, there is obtained
- a. 6-phenyl-2,3-dihydroimidazo[2,1-a]phthalazin,
- b. 6-(3,4-dichlorophenyl)-2,3-dihydroimidazo[2,1-a]phthalazine, or
- c. 8-chloro-6-(p-chlorophenyl)-2,3-dihydroimidazo[2,1-a] phthalazine, respectively.

The above products are also obtained by heating said corresponding starting phthalazine at 100°C. for 10 hours.

EXAMPLE 6

5-(p-Chlorophenyl)-5-hydroxy-2,3-dihydro-5H-imidazo[2,1-a]isoindole

A solution of 8 g. of 6-(p-chlorophenyl)-imidazo[2,1-a]phthalazine in ethanol (180 ml.) is hydrogenated at 2.5 atmosphere in presence of approximately 4 g. of Raney nickel (type W-2) until two equivalents of hydrogen are absorbed. The hydrogenation is then interrupted and the catalyst filtered off. The solution is then evaporated in vacuo and the residue containing 4'-chloro-2-(2-imidazolin-2-yl)benzhydrylidenimine is treated with 100 ml. of 2N hydrochloric acid. After stirring for 30 minutes, the reaction mixture is treated with 2N sodium hydroxide and worked up as described in example 2.

When the above process is carried out and in place of 6-(p-chlorophenyl)imidazo[2,1-a]phthalazine there is used
- a. 6-phenyl imidazo[2,1-a]phthalazine,
- b. 6-(3,4-dichlorophenyl)imidazo[2,1-a]phthalazine, or
- c. 8-chloro-6-)p-chlorophenyl)imadazo[2,1-a]phthalazine, there is obtained
- a. 5-hydroxy-5-phenyl-2,3-dihydro-5H-imidazo[2,1-a]isoindole,
- b. 5-hydroxy-5-(3,4-dichlorophenyl)-2,3-dihydro-5H-imidazo [2,1-a]isoindole, or
- c. 7-chloro-5-hydroxy-5-(p-chlorophenyl)-2,3-dihydro-5H-imidazo [2,1-a]isoindole, respectively, through the corresponding compound of formula (II) above.

When the above process is carried out and 6-(p-chlorophenyl)-2,3-dihydroimidazo[2,1-a]phthalazine and one equivalent of hydrogen are used in place of 6-(p-chlorophenyl)imidazo[2,1-a]phthalazine and two equivalents of hydrogen, respectively, the identical product is again obtained as indicated above. Products (a), (b) and (c) above are likewise obtained as indicated above.

What is claimed is:
1. A process for preparing a compound of the formula

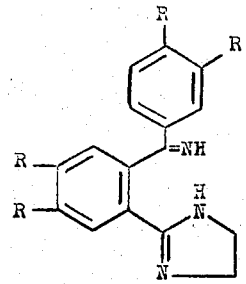

which comprises treating a compound of the formula

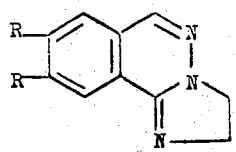

with a compound of the formula

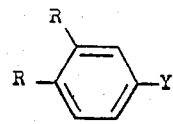

in organic solvent at a temperature of about −40° to +50°C., and hydrolyzing the resulting product to obtain a compound of the formula

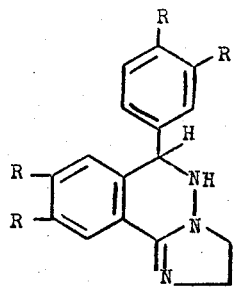

oxidizing the latter in strong oxidizing agent which is manganese dioxide, aqueous potassium permanganate or 2,3-dichloro-5,6-dicyano-benzoquinone in inert solvent at about 0° – 150°C. to obtain a compound of the formula

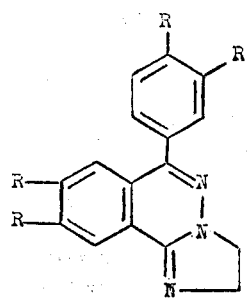

and reducing the latter with mild reducing agent which is (a) zinc, acetic acid and hydrochloric acid, or (b) Raney nickel and hydrogen to obtain a compound of the formula

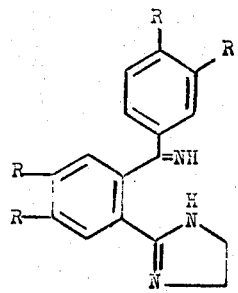

where each
R, independently, represents H or halo having an atomic weight of about 19–36, and
Y represents MgX or Li, and
X is halo of atomic weight about 35–80.

2. A process according to claim 1 wherein the strong oxidizing agent is manganese dioxide.

3. A process according to claim 1 wherein the reducing agent is zinc, acetic acid and hydrochloric acid.

4. A process for preparing a compound of the formula

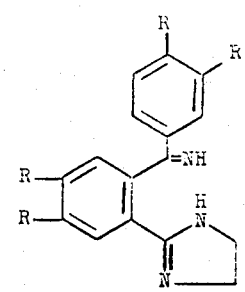

which comprises reducing with mild reducing agent which is (a) zinc, acetic acid and hydrochloric acid, or (b) Raney nickel and hydrogen a compound of the formula

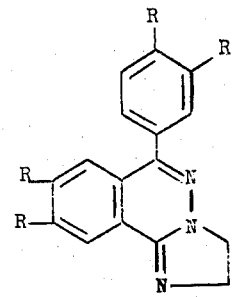

to obtain a compound of the formula

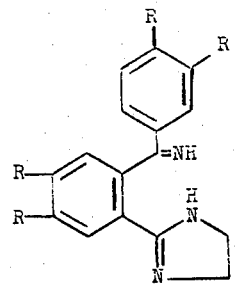

where R is as defined in claim 1.

5. A process according to claim 1 wherein the reduction is carried out with Raney nickel and hydrogen as the reduction system.

6. A process according to claim 4 wherein the reduction is carried out with Raney nickel and hydrogen as the reduction system.

* * * * *